(12) United States Patent
Kadowaki

(10) Patent No.: US 9,528,685 B2
(45) Date of Patent: Dec. 27, 2016

(54) COLOR CONVERSION SUBSTRATE, DISPLAY DEVICE, AND COLOR CONVERSION SUBSTRATE FABRICATING METHOD

(71) Applicant: Sharp Kabushiki Kaisha, Osaka (JP)

(72) Inventor: Shinya Kadowaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 209 days.

(21) Appl. No.: 14/360,603

(22) PCT Filed: Oct. 12, 2012

(86) PCT No.: PCT/JP2012/076418
§ 371 (c)(1),
(2) Date: May 23, 2014

(87) PCT Pub. No.: WO2013/077106
PCT Pub. Date: May 30, 2013

(65) Prior Publication Data
US 2014/0321101 A1 Oct. 30, 2014

(30) Foreign Application Priority Data
Nov. 24, 2011 (JP) ................. 2011-256123

(51) Int. Cl.
*F21V 9/10* (2006.01)
*G02F 1/1335* (2006.01)
(52) U.S. Cl.
CPC ............ *F21V 9/10* (2013.01); *G02F 1/1336* (2013.01); *G02F 1/133606* (2013.01); *G02F 2001/133614* (2013.01)

(58) Field of Classification Search
CPC .... F21V 9/10; G02F 1/1336; G02F 1/133606; G02F 2001/133614
USPC ........................................ 362/601
See application file for complete search history.

(56) References Cited

U.S. PATENT DOCUMENTS 6,815,125 B1* 11/2004 Okabe ............... B82Y 10/00
347/106
2012/0113672 A1* 5/2012 Dubrow ............... B82Y 20/00
362/602

FOREIGN PATENT DOCUMENTS

JP       2010-66437 A    3/2010

OTHER PUBLICATIONS

English machine translation of Hitachi (JP201066437 A), Mar. 25, 2010, Japan, specification.*

(Continued)

*Primary Examiner* — Sharon Payne
(74) *Attorney, Agent, or Firm* — Morrison & Foerster LLP

(57) ABSTRACT

A color conversion substrate includes a main plate having a first main surface and including a transparent substrate, and a fluorescent material layer including a light scattering layer formed at the first main surface for scattering incident light and emitting the light outside, and having a hole formed, and a fluorescent material body formed in said hole, exhibiting luminescence emission when light of an incident wavelength region is incident. The inner surface of the light scattering layer defining the hole reflects the light from the fluorescent material body output from the fluorescent material body towards the main plate.

12 Claims, 16 Drawing Sheets

(56) References Cited

OTHER PUBLICATIONS

Yanagida, Hiroaki. "Engineering System for Fine Particles, vol. 1, Fundamental Technology", pp. 95-97. Oct. 31, 2001.
International Search Report received for PCT/JP2012/076418, mailed on Dec. 25, 2012, 4 pages (2 pages of English translation and 2 pages of ISR).

* cited by examiner

COLOR CONVERSION SUBSTRATE, DISPLAY DEVICE, AND COLOR CONVERSION SUBSTRATE FABRICATING METHOD

CROSS REFERENCE TO RELATED APPLICATIONS

This is a U.S. National Phase patent application of PCT/JP2012/076418, filed Oct. 12, 2012, which claims priority to Japanese patent application no. 2011-256123, filed Nov. 24, 2011, each of which is hereby incorporated by reference in the present disclosure in its entirety.

TECHNICAL FIELD

The present invention relates to a color conversion substrate, a display device, and a method of fabricating a color conversion substrate.

BACKGROUND ART

Various types of color conversion substrates, and display devices including a color conversion substrate are conventionally proposed. For example, the liquid crystal display device disclosed in Japanese Patent Laying-Open No. 2010-66437 includes a blue light source, a light shutter arranged on the blue light source, and a light extraction structure arranged on the light shutter. The light extraction structure includes a substrate, a red fluorescent material layer formed on the substrate, a green fluorescent material layer, a light diffusion layer, and a reflecting film formed around each of the fluorescent material layers and the light diffusing layer.

The light emitted from the side, among the light from the fluorescent material layer, is reflected by the reflecting film to be provided outside.

CITATION LIST

Patent Document

PTD 1: Japanese Patent Laying-Open No. 2010-66437

SUMMARY OF INVENTION

Technical Problem

The display device disclosed in the aforementioned Japanese Patent Laying-Open No. 2010-66437 has the problem that the number of fabrication steps is increased since a reflecting film has to be formed. There was also the problem that the structure of the color conversion substrate is rendered complex.

In view of the foregoing, an object of the present invention is to provide a color conversion substrate, a display device, and a method of fabricating a color conversion substrate, directed to simplifying the device and simplifying the fabrication process of the device.

Solution to Problem

A color conversion substrate according to the present invention includes a main plate having a first main surface and including a transparent substrate, and a fluorescent material layer including a light scattering layer formed at the first main surface for scattering incident light and emitting the light outside, and having a hole formed, and a fluorescent material body formed in the hole, exhibiting luminescence emission when light of an incident wavelength region is incident. The inner surface of the light scattering layer defining the hole reflects the light output from the fluorescent material body towards the main plate.

Preferably, the inner surface of the light scattering layer defining the hole is arranged inclining relative to the first main surface. Preferably a plurality of the fluorescent material bodies are provided spaced apart. The distance between fluorescent material bodies is greater than the thickness of the light scattering layer. Preferably, the reflectance ratio of light of the light scattering layer is greater than the transmittance of light.

Preferably, the light scattering layer includes a second main surface and a third main surface aligned in the thickness direction. The light entering from the second main surface of the light scattering layer and output from the third main surface has Lambertian property. Preferably, the light scattering layer includes a resin layer having transmittance, and a plurality of scattering particles scattered in the resin layer. The scattering particles have Mie scattering property. The particle size of the scattering particle is greater than or equal to 200 nm and less than or equal to 1000 nm.

Preferably, the crossing angle between the inner surface of the light scattering layer defining the hole and the main plate is greater than or equal to 25° and less than or equal to 65°. Preferably, the color conversion substrate further includes a low refractive index layer, provided between the main plate and the fluorescent material body, and having a refractive index smaller than the refractive index of the fluorescent material body.

Preferably, the main plate includes a color filter provided between the fluorescent material layer and transparent substrate. The fluorescent material layer includes a first fluorescent material body exhibiting luminescence emission of light of a first wavelength region when incident light enters, and a second fluorescent material body exhibiting luminescence emission of light of a second wavelength region when incident light enters. The color filter includes a first filter portion arranged between the first fluorescent material body and the transparent substrate, a second filter portion arranged between the second fluorescent material body and the transparent substrate, and a third filter portion arranged between the light scattering layer and the transparent substrate. The first filter portion transmits light of the first wavelength region and absorbs light of other wavelength regions. The second filter portion transmits light of the second wavelength region and absorbs light of other wavelength regions. The third filter portion transmits light of the incident wavelength region and absorbs light of other wavelength regions. Preferably, the hole is formed so as to penetrate the light scattering layer.

The display device according to the present invention includes a color conversion substrate, a light source unit emitting light of an incident wavelength region, and a light shutter selectively blocking light from the light source unit to cause light from the light source unit to selectively enter the color conversion substrate. The light shutter includes a first shutter element selectively blocking light from the light source unit towards a fluorescent material body, and a second shutter element selectively blocking light from the light source unit towards the light scattering region. The distance between an incident position and the fluorescent material body is greater than the film thickness of the light scattering layer, where the incident position is where light from the light source unit and passing through the second shutter element is incident on the light scattering layer.

A method of fabricating a color conversion substrate according to the present invention includes the steps of: preparing a main plate having a main surface, and including a transparent substrate; forming a light scattering material film at the main surface; forming a hole in the light scattering material film to provide a light scattering layer; and filling the hole with fluorescent material coating such that an inner circumferential face of the light scattering layer defining the hole and the fluorescent material coating are in direct contact.

Preferably, the step of forming a light scattering layer includes the steps of applying an exposure process of selectively directing treatment light to the light scattering material film, and applying a development process to the light scattering material film subjected to the exposure process. The light scattering material film is formed of a material that is cured when irradiated with treatment light.

Preferably, the method of fabricating a color conversion substrate further includes the step of forming a liquid repellent film at a top face of the light scattering layer. The wettability of the liquid repellent film to the fluorescent material coating is lower than the wettability of the light scattering layer to the fluorescent material coating. Preferably, the wettability of the light scattering layer to the fluorescent material coating is lower than the wettability of the transparent substrate. Preferably, the fluorescent material coating is filled in the hole by an ink jet method.

A method of fabricating a color conversion substrate according to another aspect of the present invention includes the steps of: preparing a transparent substrate having a main surface; providing a fluorescent material body on the main surface; forming a light scattering material film on the main surface where the fluorescent material body is provided; and applying photolithography to the light scattering material film to remove the light scattering material film on the fluorescent material body to form a light scattering layer.

A method of fabricating a color conversion substrate according to a further aspect of the present invention includes the steps of: forming a main surface; providing a fluorescent material body on the main surface, forming a liquid repellent film at a top face of the fluorescent material body; and after the liquid repellent film is formed, spraying light scattering material onto the main surface by an ink jet method.

Advantageous Effects of Invention

According to the color conversion substrate and display device of the present invention, the structure of the device per se can be simplified. Moreover, according to the color conversion substrate fabricating method, a color conversion substrate can be fabricated by a simple process.

DESCRIPTION OF EMBODIMENTS

Based on FIGS. 1-33, a color conversion substrate, a display device, and a method of fabricating a color conversion substrate according to embodiments will be described.

First Embodiment

Figure 1:
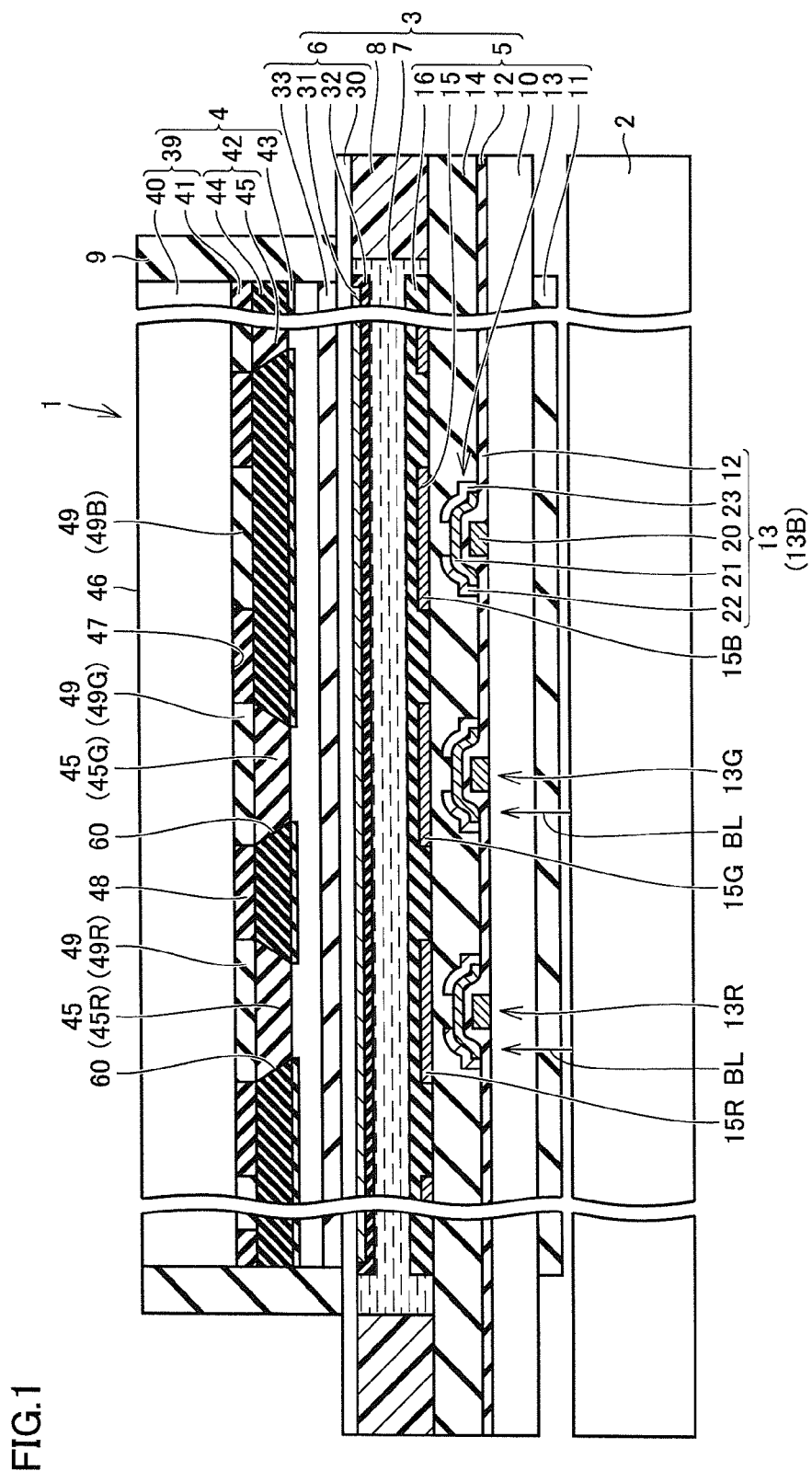
FIG. 1 is a sectional view representing a display device 1 according to a first embodiment.

FIG. 1 is a sectional view representing a display device 1 according to a first embodiment. As shown in FIG. 1, display device 1 includes a light source unit 2 emitting blue light BL, a light shutter 3 arranged above light source unit 2, and a color conversion substrate 4 arranged above light shutter 3. Light shutter 3 and color conversion substrate 4 are coupled with each other via a secure member 9.

Light source unit 2 is, for example, a surface emission unit including a plurality of LEDs (Light Emitting Diode) arranged in an array, directing blue light BL towards light shutter 3. Blue light BL output from light shutter 3 is substantially collimated. The wavelength region of this blue light BL is, for example, greater than or equal to 390 nm and less than or equal to 510 nm. The wavelength when the intensity of blue light BL becomes highest is approximately 450 nm, for example.

Light shutter 3 selectively blocks blue light BL output from light source unit 2 to selectively cause blue light BL from light source unit 2 to enter color conversion substrate 4.

Light shutter 3 includes a TFT (Thin Film Transistor) substrate 5 arranged at the side of light source unit 2, an opposite substrate 6 arranged at the side opposite to light source unit 2 relative to TFT substrate 5, a liquid crystal layer 7 sealed between TFT substrate 5 and opposite substrate 6, and a seal member 8 for sealing liquid crystal layer 7.

TFT substrate 5 includes a transparent substrate 10 such as a glass substrate, a polarizing plate 11 formed at a main surface of transparent substrate 10, facing light source unit 2, a plurality of TFT transistors 13 formed at a main surface of transparent substrate 10, at the side opposite to polarizing plate 11, an interlayer insulation film 14 formed to cover TFT transistors 13, a pixel electrode 15 formed on interlayer insulation film 14, and an alignment film 16 formed to cover pixel electrode 15.

TFT transistor 13 includes a gate electrode 20 formed on the main surface of transparent substrate 10, a gate insulation film 12 formed so as to cover gate electrode 20, a semiconductor layer 21 formed on gate insulation film 12, and a source electrode 22 and a drain electrode 23 formed on semiconductor layer 21, spaced apart from each other.

Pixel electrode 15 is formed of a transparent conductor film such as an ITO (Indium Tin Oxide) film or IZO (Indium Zinc Oxide) film. Pixel electrode 15 is connected to drain electrode 23 by a contact not shown. Accordingly, when TFT transistor 13 is ON, a predetermined voltage is applied to pixel electrode 15.

TFT transistor 13 is provided in plurality. In the example shown in FIG. 1, TFT transistors 13R, 13G and 13B are provided. Each of TFT transistors 13R, 13G and 13B is provided in plurality.

TFT transistors 13R, 13G and 13B are connected to pixel electrodes 15R, 15G and 15B, respectively.

Gate insulation film 12 and interlayer insulation film 14 are transparent insulation films such as a silicon oxide film or silicon nitride film. Alignment film 16 is formed of a polyimide film having the surface subjected to rubbing treatment to allow control of the direction of orientation of the liquid crystal molecules. Liquid crystal layer 7 includes a plurality of liquid crystal molecules.

Opposite substrate 6 includes a glass substrate 30 formed of glass and the like, a common electrode 31 formed at a main surface of glass substrate 30, facing TFT substrate 5, an alignment film 32 formed to cover common electrode 31, and a polarizing plate 33 formed at a main surface of glass substrate 30, facing color conversion substrate 4. Seal member 8 is formed in an angular form along the outer circumferential edge of TFT substrate 5 and opposite substrate 6 to seal liquid crystal layer 7 between color conversion substrate 4 and TFT substrate 5.

Color conversion substrate 4 includes a main plate 39, a fluorescent material layer 42 formed at a main surface of main plate 39, facing light shutter 3, and a liquid repellent layer 43 formed at a portion of a main surface of fluorescent material layer 42, facing light shutter 3. Main plate 39 includes a transparent substrate 40 such as a glass substrate, and a color filter 41 formed at a main surface of transparent substrate 40, facing light shutter 3.

Transparent substrate 40 is formed in the shape of a plate, including a main surface 46 and a main surface 47 aligned in the direction of the thickness.

Color filter 41 includes a black matrix 48 having a light blocking effect, formed as a frame, and a filter portion 49 filling the hole formed in black matrix 48.

Filter portion 49 includes a red filter portion 49R, a green filter portion 49G, and a blue filter portion 49B.

Red filter portion 49R is arranged above pixel electrode 15R. Green filter portion 49G is arranged above pixel electrode 15G. Blue filter portion 49B is arranged above pixel electrode 15B.

Red filter portion 49R transmits red light (light of a wavelength region greater than or equal to 530 nm and less than or equal to 690 nm) while absorbing light of a wavelength other than the aforementioned wavelength region. Green filter portion 49G transmits green light (light of a wavelength region greater than or equal to 460 nm and less than or equal to 580 nm) while absorbing light of a wavelength other than the aforementioned wavelength region.

Blue filter portion 49B transmits blue light (light of a wavelength region greater than or equal to 390 nm and less than or equal to 510 nm) while absorbing light of a wavelength region other than the aforementioned wavelength region.

Fluorescent material layer 42 includes a light scattering layer 44 having a plurality of holes 60 formed, and a plurality of fluorescent materials bodies 45 filled in holes 60 of light scattering layer 44. The inner circumferential face of light scattering layer 44 defining a hole 60 is directly in contact with fluorescent material body 45. Hole 60 is formed to penetrate light scattering layer 44.

Light scattering layer 44 diffuses internal incident light, and outputs light outside. Light scattering layer 44 includes, for example, transparent resin as a binder, and a plurality of scattering particles scattered in the resin.

The scattering particles have Mie scattering property. The particle size of the scattering particles is generally greater than or equal to 200 nm and less than or equal to 1000 nm. Preferably, the particle size of the scattering particles is greater than or equal to 400 nm and less than or equal to 500 nm.

The scattering particles having Mie scattering property will be described hereinafter. In general, Mie scattering implies the scattering phenomenon of light caused by sphere particles (scattering particles) of a size greater than or equal to the light wavelength. The scattering intensity S can be obtained from equations (1), (2) and (3) set forth below, where $\lambda$ is the wavelength of incident light entering the scattering particles, m is the relative refractive index of the scattering particle relative to the binder, and Dp is the diameter of the scattering particle.

$$\alpha = \pi \times Dp/\lambda \quad (1)$$

$$\beta = m \times \alpha \quad (2)$$

$$S(\theta) = \frac{1}{2} \times (\lambda/2\pi)^2 \{|S_1(\theta)|^2 + |S_2(\theta)|^2\} \quad (3)$$

"$S_1(\theta)$" and "$S_2(\theta)$" can be calculated from the n-th relationship of $\pi_n$, $P_n$ in the polynomial expression of Legenedre. The aforementioned Mie scattering logic is described in detail in "Engineering System for Fine Particles, Volume 1, Fundamental Technology, supervised by Hiroaki Yanagida, pp. 95-97", and the like.

In the present embodiment, scattering particles having the aforementioned Mie scattering property are embedded in the resin at the density of approximately 4-20%.

For example, when blue light BL enters light scattering layer 44 from the side of light shutter 3, blue light BL is output from the main surface of light scattering layer 44 that faces color filter 41. The outgoing light has Lambertian property.

Figure 2:
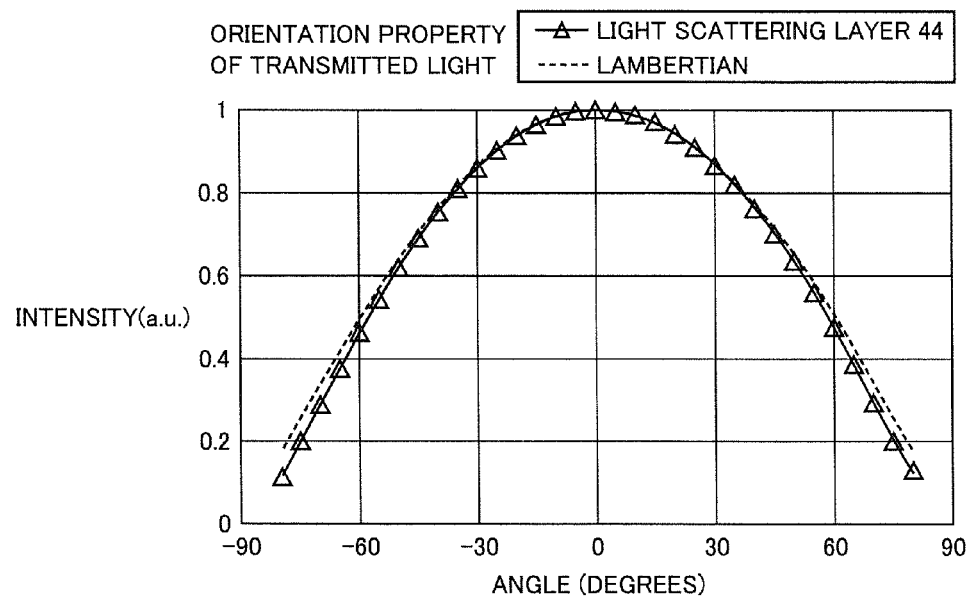
FIG. 2 is a graph representing the light orientation property of a light scattering layer 44.
Figure 3:
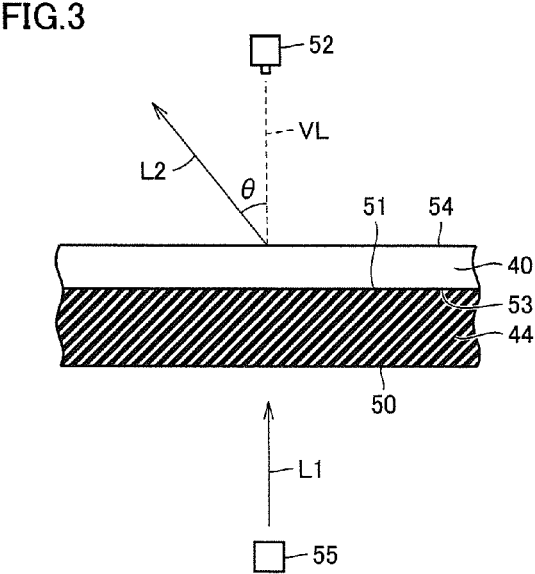
FIG. 3 schematically represents a manner of measuring the light orientation property of light scattering layer 44.

FIG. 2 is a graph representing the light orientation property of light scattering layer 44. FIG. 3 schematically represents the manner of measuring the light orientation property of light scattering layer 44.

Referring to FIG. 3, a sample piece is prepared to which collimated light is directed from light source 55. The sample piece includes a transparent substrate 40 having a main surface 53 and a main surface 54 aligned in the direction of the thickness, and a light scattering layer 44 formed at main surface 53. Light scattering layer 44 includes a main surface 50 and a main surface 51 aligned in the direction of the thickness. Main surface 51 of light scattering layer 44 forms contact with main surface 53 of transparent substrate 40.

Light scattering layer 44 includes acryl-based transparent resin, and a plurality of scattering particles scattered in the transparent resin. The particle size of the scattering particles is greater than or equal to 200 nm and less than or equal to 1000 nm. For scattering particles, $TiO_2$, for example, is employed. Light scattering layer 44 has a film thickness of 3.7 μm.

Then, incident light L1 from light source 55 strikes main surface 50 of light scattering layer 44. A measurement device 52 measures outgoing light L2 output from main surface 54 of transparent substrate 40. In FIG. 3, the virtual axis line perpendicular to main surface 54 is taken as a virtual line VL. The angle between this virtual line VL and reflected light L2 is θ. Measurement device 52 measures the intensity of outgoing light L2 for each angle θ. For measurement device 52, a variable angle color-difference meter (GC5000 made by NIPPON DENSHOKU INDUSTRIES Co. Ltd) was employed.

The graph of FIG. 2 shows the relationship between outgoing light L2 measured as set forth above and angle θ. In this graph, the angle θ is plotted along the horizontal axis, whereas the intensity of outgoing light L2 is plotted along the vertical axis. The intensity along the vertical axis is based on a normalized value where the intensity of outgoing light L2 when angle θ is 0 is "1", and indicates the intensity of outgoing light L2 at other angles θ.

As indicated by the solid line in FIG. 2, it is appreciated that light scattering layer 44 has high Lambertian property. In the graph of FIG. 2, the broken line represents the curve of perfect Lambertian property. It is appreciated that the light orientation property of light scattering layer 44 substantially has perfect Lambertian property.

The transmittance of light scattering layer 44 is 37.46%, and the reflectance ratio is 62.04%. The transmittance of light scattering layer 44 was measured using a haze meter (NDH2000 made by NIPPON DENSHOKU INDUSTRIES Co. Ltd). This transmittance refers to the total light transmittance. The reflectance ratio was measured using a spectrophotometer (CM-2002 made by Minolta). Thus, light scattering layer 44 has a reflectance ratio higher than the transmittance.

In FIG. 1, light scattering layer 44 has a plurality of holes 60 formed spaced apart from each other. Red fluorescent material body 45R and green fluorescent material body 45G are filled in hole 60, spaced apart from each other. In the present embodiment, hole 60 penetrates light scattering layer 44, and is formed such that the top and bottom faces of red fluorescent material body 45R and the top and bottom faces of green fluorescent material body 45G are exposed at light scattering layer 44. The top faces of green fluorescent material body 45G and red fluorescent material body 45R are in contact with the main surface of color filter 41. The bottom faces of green fluorescent material body 45G and red fluorescent material body 45R are in direct contact with light shutter 3. Therefore, blue light BL from opposite substrate 6 directly enters the bottom faces of green fluorescent material body 45G and red fluorescent material body 45R.

Upon entry of blue light BL to red fluorescent material body 45R, red fluorescent material body 45R excites to exhibit luminescence emission of red light. The peak wavelength where the intensity of the red light is highest is at 610 nm and vicinity thereof. The wavelength region of red light is, for example, greater than or equal to 530 nm and less than or equal to 690 nm. Upon entry of blue light BL to green fluorescent material body 45G, green fluorescent material body 45 excites to exhibit luminescence emission of green light. The peak wavelength where the intensity of the green light is highest is at 520 nm and vicinity thereof. The wavelength region of green light is, for example, greater than or equal to 460 nm and less than or equal to 580 nm.

Red fluorescent material body 45R and green fluorescent material body 45G are formed of organic fluorescent material or nano fluorescent material. As organic fluorescent material, rhodamine-based pigment such as rhodamine B for the red fluorescent pigment, and coumarin-based pigment such as coumarin-6 for the green fluorescent pigment can be cited. The nano fluorescent material includes a binder, and a plurality of fluorescent materials bodies diffused in the binder. The binder is formed of transparent resin such as of silicon, epoxy, or acryl base. For the fluorescent material, nano-particle fluorescent material such as CdSe or ZnS can be used. By forming red fluorescent material body 45R by the aforementioned material, red fluorescent material body 45R can transmit red light (light having a wavelength region greater than or equal to 530 nm and less than or equal to 690 nm). Accordingly, the light emitted by excitation of red fluorescent material body 45R can pass through red fluorescent material body 45R per se to improve the usage efficiency of light therefrom.

Similarly, green fluorescent material body 45G can transmit green light. Light emitted by excitation of green fluorescent material body 45G can pass through green fluorescent material body 45G per se to improve the usage efficiency of light therefrom. Liquid repellent layer 43 is formed of a material exhibiting high repellency.

Figure 4:
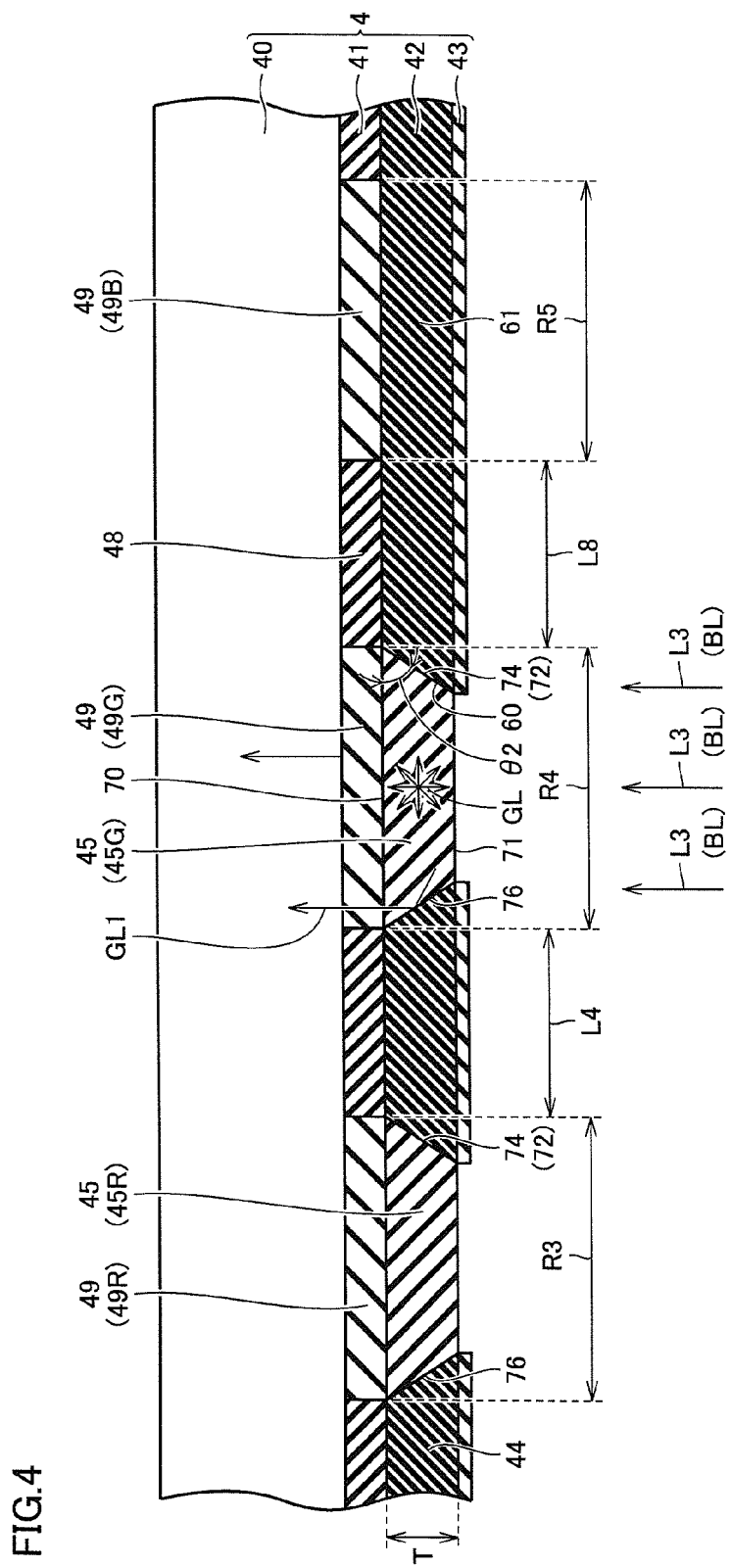
FIG. 4 is an enlarged sectional view of a part of color conversion substrate 4.

FIG. 4 is an enlarged sectional view of a portion of color conversion substrate 4. As shown in FIG. 4, both red fluorescent material body 45R and green fluorescent material body 45G are formed to have a cross section of a trapezoidal shape.

In other words, red fluorescent material body 45R and green fluorescent material body 45G are formed such that the width becomes smaller as a function of distance from transparent substrate 40.

Figure 5:
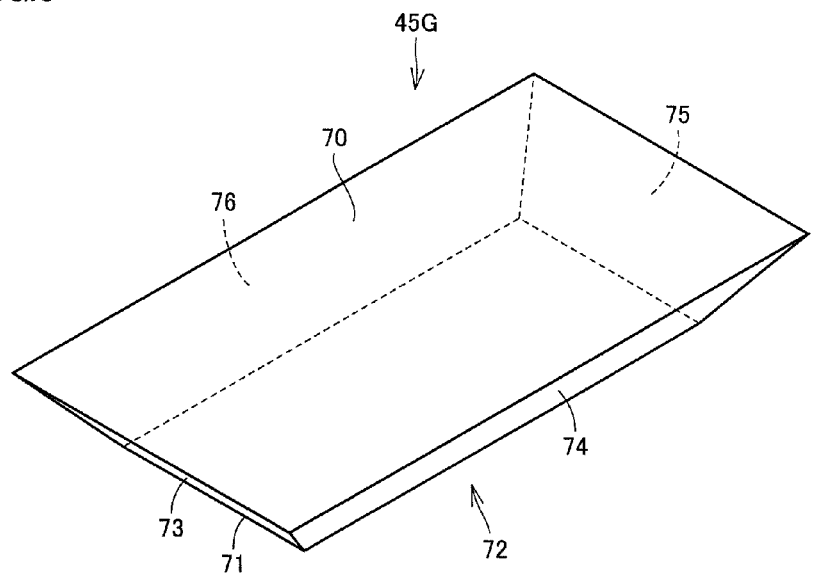
FIG. 5 is a perspective view of a green fluorescent material body 45G.
Figure 6:
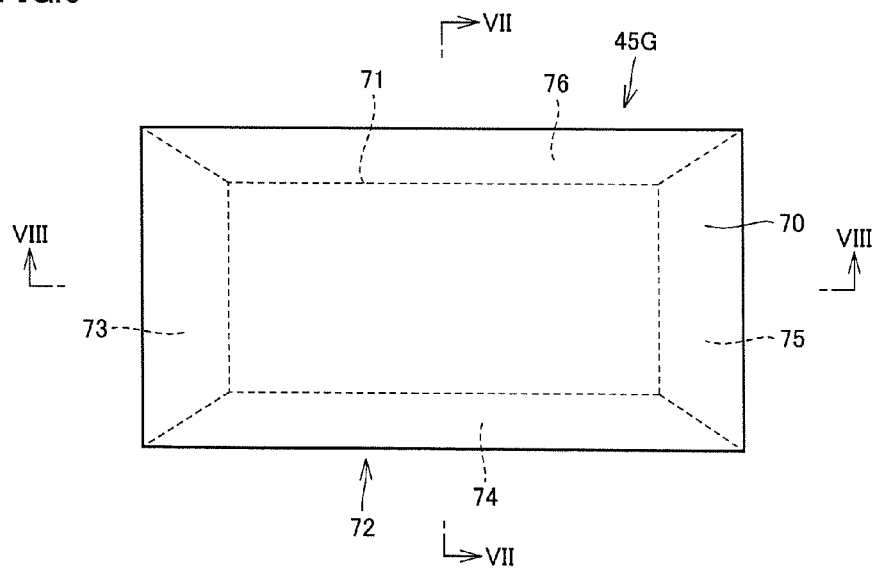
FIG. 6 is a plan view of green fluorescent material body 45G.

FIG. 5 is a perspective view of green fluorescent material body 45G. FIG. 6 is a plan view of green fluorescent material body 45G. As shown in FIGS. 5 and 6, green fluorescent material body 45G has a truncated quadrangular pyramidal shape.

Green fluorescent material body 45G includes a top face (main surface) 70 and a bottom face (main surface) 71 aligned in the direction of the thickness, and a circumferential face 72 formed to be continuous with top face 70 and bottom face 71. Bottom face 71 is arranged so as to face light shutter 3 shown in FIG. 1, having blue light BL incident from light source unit 2. Top face 70 is in contact with the main surface of color filter 41, and qualified as the outgoing face from which the light of luminescence emission in green fluorescent material body 45G is output.

Circumferential face 72 extends upright from the outer circumferential edge of bottom face 71, connecting to the outer circumferential edge of circumferential face 72.

Circumferential face 72 includes side faces 74 and 76 aligned in the direction of the width, and side faces 73 and 75 aligned in the longitudinal direction.

Figure 7:
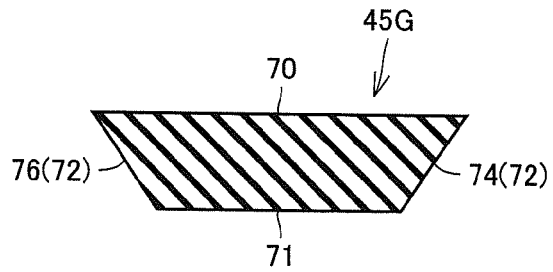
FIG. 7 is a sectional view taken along line VII-VII of FIG. 6.
Figure 8:
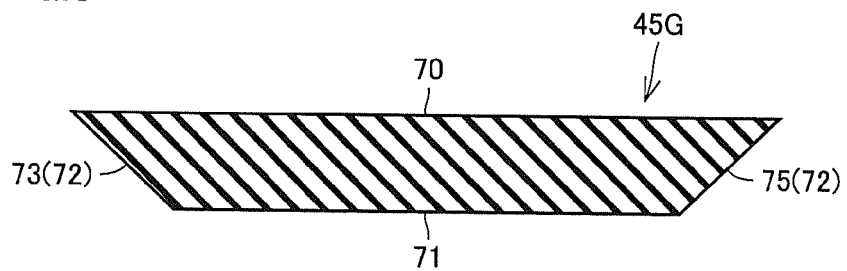
FIG. 8 is a sectional view taken along line VIII-VIII of FIG. 6.

FIG. 7 is a sectional view taken along line VII-VII of FIG. 2. As shown in FIG. 7, at the cross section perpendicular to the longitudinal direction, green fluorescent material body 45G is formed to take a trapezoidal shape. FIG. 8 is a sectional view taken along line VIII-VIII shown in FIG. 6. As shown in FIG. 8, at the cross section perpendicular to the direction of the width, green fluorescent material body 45G is formed to take a trapezoidal configuration.

Although description has been provided corresponding to the shape of green fluorescent material body 45G, the same applies to red fluorescent material body 45R.

In FIG. 4, the inner circumferential face of hole 60 is directly in contact with circumferential face 72 of green fluorescent material body 45G. As used herein, the angle between circumferential face 72 and the main surface of color filter 41 is angle $\theta 2$. Angle $\theta 2$ is set greater than or equal to $25°$ and less than or equal to $65°$. Preferably, this angle is set greater than or equal to $40°$ and less than or equal to $50°$.

Distance L4 between red fluorescent material body 45R and green fluorescent material body 45G is set greater than film thickness T of light scattering layer 44.

Figure 9:
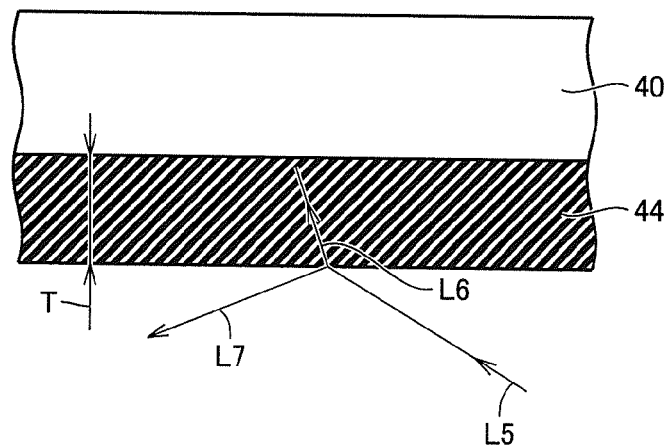
FIG. 9 is a sectional view of a sample piece used to test the reflectance ratio of the light scattering layer.
Figure 10:
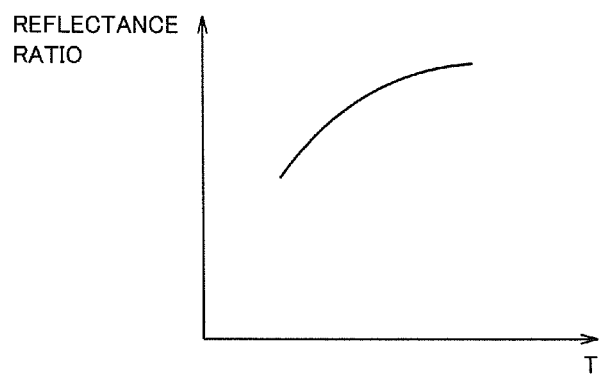
FIG. 10 is a graph representing the relationship between a film thickness T and reflectance ratio of light scattering layer 44.

The relative relationship between film thickness T of light scattering layer 44 and the reflectance ratio of light scattering layer 44 will be described hereinafter. FIG. 9 is a sectional view of a sample piece used for testing the reflectance ratio of the light scattering layer. FIG. 10 is a graph representing the relationship between film thickness T of light scattering layer 44 and the reflectance ratio of light scattering layer 44.

Referring to FIG. 9, the sample piece includes transparent substrate 40 and light scattering layer 44 formed at the bottom face of transparent substrate 40. Incident light L5 is caused to enter light scattering layer 44.

Results of different film thickness T with a constant incident angle of incident light L5 is shown in FIG. 10. In the graph of FIG. 10, film thickness T of light scattering layer 44 is plotted along the horizontal axis whereas the reflectance ratio of light scattering layer 44 is plotted along the vertical axis. As shown in FIG. 10, it is appreciated that the reflectance ratio of light scattering layer 44 becomes larger as film thickness T is increased, as shown in FIG. 10.

The operation of display device 1 configured as set forth above will be described with reference to FIG. 1 and the like. Referring to FIG. 1, blue light BL is directed from light source unit 2 towards light shutter 3. Blue light BL is collimated light.

First, the case where blue light BL enters green fluorescent material body 45G to cause emission of green light will be described.

In this case, voltage is applied to gate electrode 20 of TFT transistor 13G, among the plurality of TFT transistors 13R, 13G and 13B. As a result, voltage is applied to drain electrode 23 of TFT transistor 13G, which in turn causes predetermined voltage to be applied to pixel electrode 15G connected to drain electrode 23. Meanwhile, predetermined voltage is also applied to common electrode 31, causing electric field to be generated between common electrode 31 and pixel electrode 15G. Accordingly, the alignment of liquid crystal molecules between pixel electrode 15G and common electrode 31 changes.

Thus, under the state where TFT transistor 13G is ON and TFT transistors 13R, 13B are OFF, blue light BL from light source unit 2 enters light shutter 3.

Blue light BL passes through polarizing plate 11, transparent substrate 10, TFT transistors 13R, 13G, and 13B, pixel electrodes 15R, 15G, 15B, liquid crystal layer 7, alignment film 32, common electrode 31, and glass substrate 30.

Then, blue light BL enters polarizing plate 33. Only blue light BL travelling through pixel electrode 15G, from overall blue light BL entering polarizing plate 33, passes through polarizing plate 33.

In FIG. 4, incident light L3 corresponds to blue light BL passing through pixel electrode 15B and entering color conversion substrate 4.

The region irradiated with blue light BL is restricted since blue light BL passing through pixel electrode 15G shown in FIG. 1 is directed towards green fluorescent material body 45G. In the example shown in FIG. 4, blue light BL directed towards green fluorescent material body 45G is restricted to the region of R4.

Thus, during input of blue light BL to green fluorescent material body 45G, entry of blue light BL to red fluorescent material body 45R and blue filter portion 49B adjacent to the relevant green fluorescent material body 45G is suppressed.

When blue light BL is to be entered to red fluorescent material body 45R shown in FIG. 1, only TFT transistor 13R is ON. As a result, blue light BL enters region R3 shown in FIG. 4. Accordingly, blue light BL is incident to red fluorescent material body 45R.

When outgoing blue light is to be output, TFT transistor 13B shown in FIG. 1 attains an ON state, whereas the remaining TFT transistors 13R and 13G are OFF.

Accordingly, blue light BL from light source unit 2 is incident to region R5, entering an incident region 61 that is a portion of fluorescent material layer 42, as shown in FIG. 4.

Thus, polarizing plate 11, TFT transistors 13R, 13G, 14B and polarizing plate 33 shown in FIG. 1 function as elements selectively blocking blue BL from light source unit 2.

Upon the entry of blue light BL into green fluorescent material body 45G in FIG. 4, green fluorescent material body 45G is excited to exhibit luminescence emission of green light L. At this stage, green light GL is emitted in a radial manner.

The light travelling towards green filter portion 49G from the radial light rays of green GL passes through green filter portion 49G to be output outside.

Meanwhile, green light GL1 traveling sideway from the radial light rays of green GL is incident on the inner side face of hole 60.

Distance L4 between red fluorescent material body 45R and green fluorescent material body 45G is greater than film thickness T. The reflectance ratio of fluorescent material layer 42 becomes higher as a function of greater thickness in the light incident direction, as shown in FIG. 10.

Therefore, the reflectance ratio of light scattering layer 44 is high since the thickness of light scattering layer 44 in the incident direction of blue light BL1 is great. Thus, as shown in FIG. 4, green light GL1 is reflected at the inner side face of hole 60.

The angle between the inner side face of hole 60 and the main surface of color filter 41 is set greater than or equal to 25° and less than or equal to 65°. Therefore, a large portion of green light GL incident on the inner side face of hole 60 is reflected towards transparent substrate 40 to be output outside. Moreover, by setting the angle between the inner side face of hole 60 and the main surface of color filter 41 greater than or equal to 40° and less than or equal to 50°, the sideway-directed light can be made to travel towards transparent substrate 40 as regular-reflected green light L.

When red fluorescent material body 45R is to provide luminescence emission of blue light BL, blue light BL passes through pixel electrode 15R to enter region R. As a result, blue light BL enters red fluorescent material body 45R. This entry of blue light BL to red fluorescent material body 45R causes excitation thereof to emit radial light rays of red. Since distance L4 is greater than the film thickness T, blue light BL incident on the inner side face of hole 60 is favorably reflected thereat.

When blue light is to be output outside, blue light BL passes through pixel electrode 15B into region R5. As a result, blue light BL enters incident region 61 of fluorescent material layer 42. Blue light BL in incident region 61 is scattered therein, and then emitted towards transparent substrate 40.

At this stage, blue light BL output from incident region 61 has Lambertian property, as shown in FIG. 2. The outgoing light from green fluorescent material body 45G and red fluorescent material body 45R also has Lambertian property. The property of light from green fluorescent material body 45G and red fluorescent material body 45R is indicated by the broken line in FIG. 2.

Therefore, the orientation property of light output from red fluorescent material body 45R and green fluorescent material body 45G can be made to be proximate to the orientation property of light output from incident region 61.

Specifically, the difference between the intensity of light output from red fluorescent material body 45R and green fluorescent material body 45G and the intensity of light output from incident region 61 is desirably less than or equal to 5% the intensity of blue light BL output from incident region 61 for each angle (outgoing angle). The observer will not perceive color difference when viewing between the front direction and an oblique direction as long as the intensity difference is within this range. The observer can see the displayed image without perceiving strangeness.

The particle size of the scattering particles included in light scattering layer 44 according to the present embodiment is greater than or equal to 200 nm and less than or equal to 1000 nm. By employing such scattering particles, light scattering layer 44 exhibits Lambertian property. Further, by setting the particle size of the scattering particles greater than or equal to 400 nm and less than or equal to 500 nm, the Lambertian property of light scattering layer 44 can be further improved.

The distance L8 between incident region 61 and green fluorescent material body 45G is greater than film thickness T. Therefore, the reaching of blue light BL to green fluorescent material body 45G can be suppressed even if blue light BL incident on incident region 61 is scattered within incident region 61. Therefore, the mixing of green light, when blue light is to be output outside, can be suppressed. As a result, a sharp image can be displayed by display device 1 according to the present embodiment.

During usage of display device 1, there may be the case where externally input light passes through transparent substrate 40 to enter color conversion substrate 4 towards red fluorescent material body 45R and the like.

In this case, only red light from the externally applied light enters red fluorescent material body 45R due to the arrangement of red filter portion 49R above red fluorescent material body 45R. Since red fluorescent material body 45R is formed of a material that excites when blue light is incident, luminescence emission of red fluorescent material body 45R is suppressed by entry of red light thereto.

Similarly, green fluorescent material body 45G has green filter portion 49G arranged thereabove. Therefore, externally input light is absorbed by green filter portion 49G, except for green light. Only green light reaches green fluorescent material body 45G. Luminescence emission of green fluorescent material body 45 is suppressed since green fluorescent material body 45G is not excited by light other than blue light.

In the case where externally input light is reflected at the surface of light scattering layer 44, at least a portion of the externally input light is absorbed by color filter 41. Therefore, the amount of reflected light, even if externally input light is reflected at light scattering layer 44, can be reduced.

Specifically, when externally input light is reflected at region R5 of light scattering layer 44, only blue light is reflected by blue filter portion 49B. Particularly, at region L4 and L8 of light scattering layer 44, externally input light, if any, can be prevented from being reflected by black matrix 48. As a result, the amount of reflected light, even if externally input light enters color conversion substrate 4, can be reduced.

A method of fabricating display device 1 configured as set forth above will be described hereinafter. In the production of display device 1 shown in FIG. 1, light source unit 2, light shutter 3, and color conversion substrate 4 are produced separately, and then assembled together as a unit. In the present embodiment, the method of fabricating color conversion substrate 4 will be mainly described.

Figure 11:
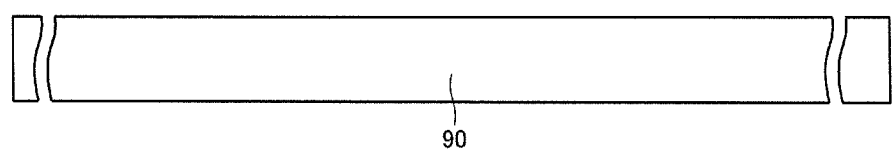
FIG. 11 is a sectional view representing a first step in a fabrication process of color conversion substrate 4.
Figure 12:
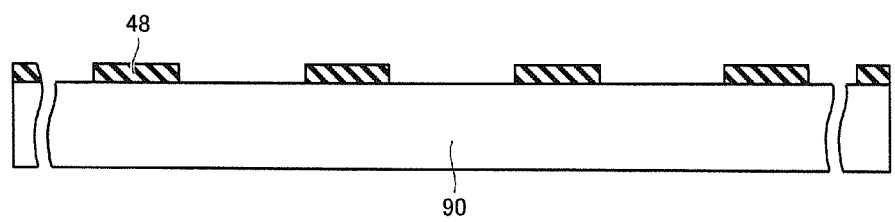
FIG. 12 is a sectional view representing a step subsequent to the fabrication step of FIG. 11.

FIG. 11 is a sectional view representing the first step in the fabrication process of color conversion substrate 4. As shown in FIG. 11, a mother substrate 90 such as a glass substrate is prepared. FIG. 12 is a sectional view representing the step following the fabrication step shown in FIG. 11. As shown in FIG. 12, photosensitive resin containing carbon black or the like is applied by spin coating or the like on the main surface of mother substrate 90.

Following a baking process to this resin film, the resin film is subject to patterning by photolithography. Accordingly, black matrix 48 is formed.

Figure 13:
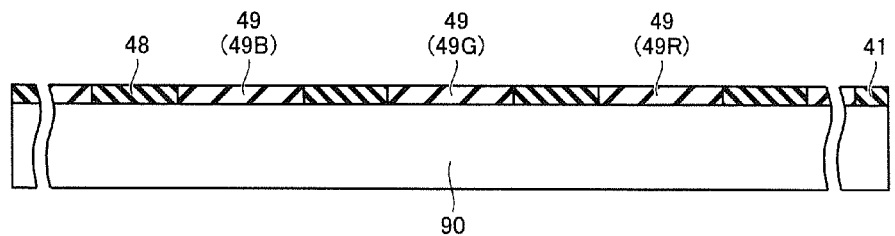
FIG. 13 is a sectional view representing a step subsequent to the fabrication step of FIG. 12.

FIG. 13 is a sectional view of a step subsequent to the fabrication step shown in FIG. 12. As shown in FIG. 13, the hole formed in black matrix 48 is filled with filter coating by an ink jet method. Then, this filter coating is subject to baking to form filter portion 49. Thus, color filter 41 is formed on the main surface of mother substrate 90.

Figure 14:
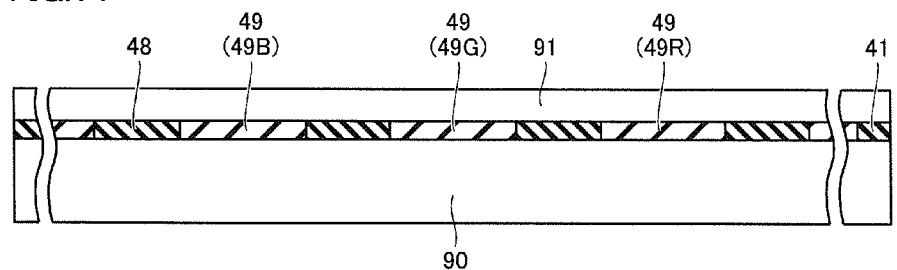
FIG. 14 is a sectional view representing a step subsequent to the fabrication step of FIG. 13.

FIG. 14 is a sectional view representing a step subsequent to the fabrication step shown in FIG. 13. A light scattering material film 91 is formed on the top face of color filter 41. In the present embodiment, light scattering material film 91 includes a negative type photo curable agent.

Figure 15:
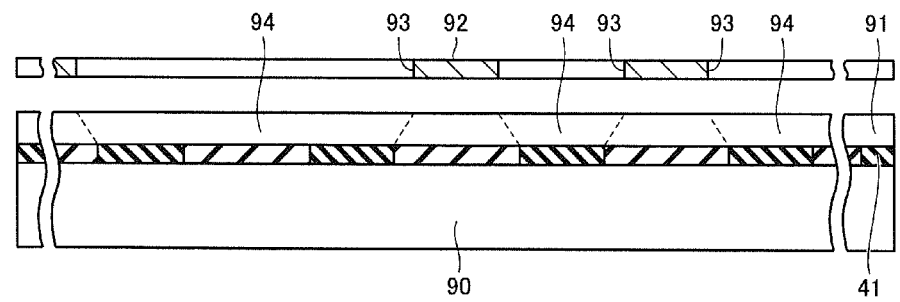
FIG. 15 is a sectional view representing a step subsequent to the fabrication step of FIG. 14.

FIG. 15 is a sectional representing a step subsequent to the fabrication step shown in FIG. 14. As shown in FIG. 15, a mask 92 is arranged above light scattering material film 91. Ultraviolet ray (treatment light) is directed from above mask 92. A hole 93 corresponding to the region of light scattering layer 44 to be formed is provided in mask 92. Ultraviolet ray passes through hole 93 to strike light scattering layer 44.

The portion of light scattering material film 91 irradiated with ultraviolet ray is cured to form a cured portion 94 in light scattering material film 91.

The width of cured portion 94 becomes smaller as a function of approaching color filter 41. As a result, the side face of cured portion 94 is inclined. In the step shown in FIG. 15, light scattering material film 91 is subject to exposure.

Figure 16:
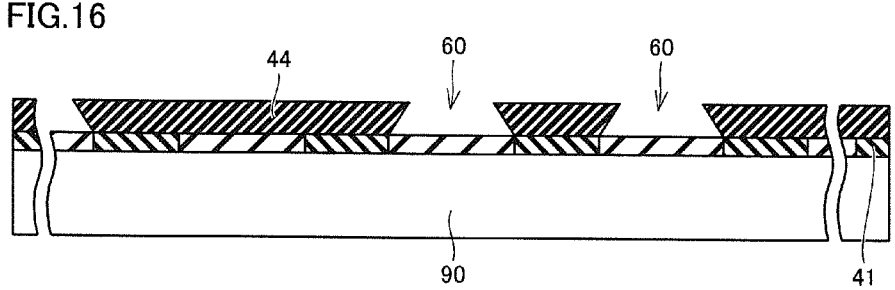
FIG. 16 is a sectional view representing a step subsequent to the fabrication step of FIG. 15.

FIG. 16 is a sectional view representing a step subsequent to the fabrication step shown in FIG. 15. As shown in FIG. 16, any unexposed portion of light scattering material film 91 is removed using a developing agent or the like. Accordingly, cured portion 94 shown in FIG. 15 remains to form a light scattering layer 44 having a plurality of holes 60. Here, the inner side face of hole 60 is inclined.

Figure 17:
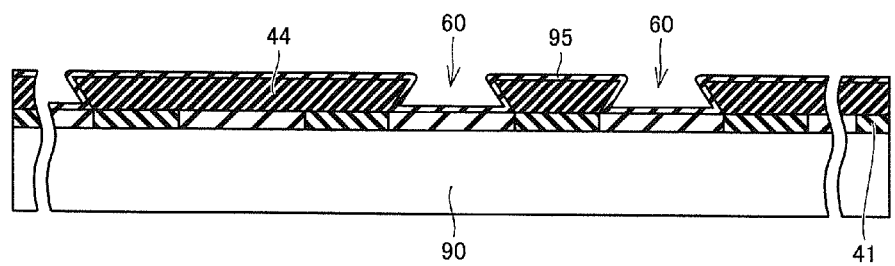
FIG. 17 is a sectional view representing a step subsequent to the fabrication step of FIG. 16.

FIG. 17 is a sectional view representing a step subsequent to the fabrication step shown in FIG. 16. As shown in FIG. 17, a repellent material film 95 is applied so as to cover light scattering layer 44. This repellent material film 95 includes a photo curable agent, causing any region subject to ultraviolet ray to be cured. Repellent material film 95 is formed on the top face of light scattering layer 44, the inner side face of hole 60, and the top face of color filter 41 exposed at hole 60.

Figure 18:
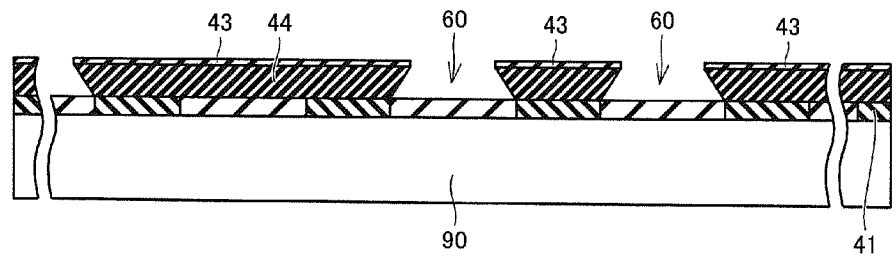
FIG. 18 is a sectional view representing a step subsequent to the fabrication step of FIG. 17.

FIG. 18 is a sectional view representing a step subsequent to the fabrication step shown in FIG. 17. As shown in FIG. 18, repellent material film 95 is subject to exposure and development. Specifically, a mask is arranged above repellent material film 95 under the state shown in FIG. 17. This mask has a hole formed, corresponding to the region of the top face of light scattering layer 44. Ultraviolet ray is directed towards light scattering layer 44 from above the mask to expose a portion of light scattering layer 44. The region of light scattering layer 44 irradiated with ultraviolet ray is cured.

Then, any unexposed portion of repellent material film 95 is removed using a solvent. Thus, a liquid repellent layer 43 is formed on the top face of light scattering layer 44.

The wettability of liquid repellent layer 43 to the fluorescent material body is lower than the wettability of light scattering layer 44 to the fluorescent material body.

Figure 19:
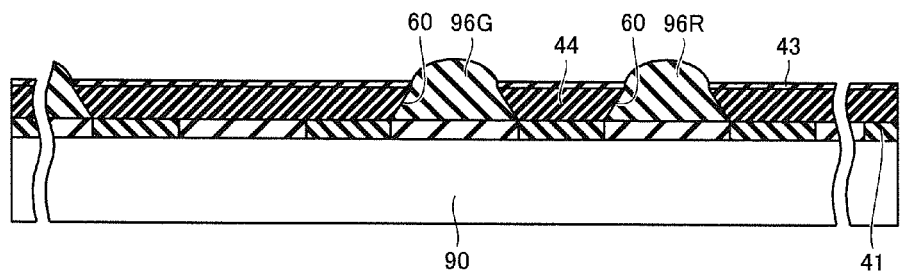
FIG. 19 is a sectional view representing a step subsequent to the fabrication step of FIG. 18.

FIG. 19 is a sectional view representing a step subsequent to the fabrication step shown in FIG. 18. As shown in FIG. 19, hole 60 is filled with green fluorescent material 96G and red fluorescent material 96R by an ink jet method.

Since liquid repellent layer 43 having low wettability is formed at the top face of light scattering layer 44, the spreading of the sprayed green fluorescent material 96G and red fluorescent material 96R up to the top face of light scattering layer 44 can be suppressed.

Figure 20:
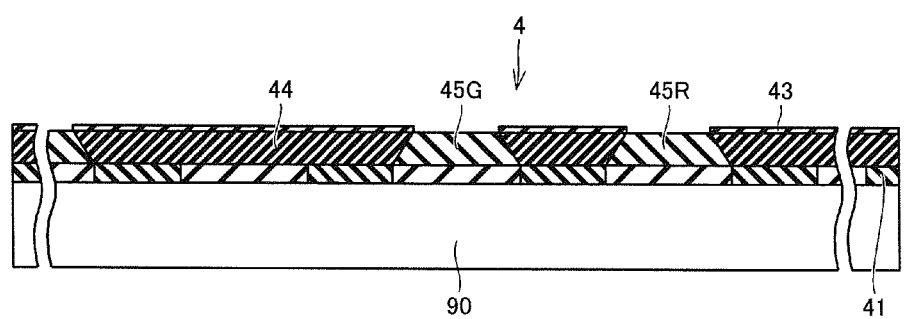
FIG. 20 is a sectional view representing a step subsequent to the fabrication step of FIG. 19.

FIG. 20 is a sectional view representing a step subsequent to the fabrication step shown in FIG. 19. In the step of FIG. 20, green fluorescent material 96G and red fluorescent material 96R shown in FIG. 19 are subject to baking. Accordingly, green fluorescent material body 45G and red fluorescent material body 45R are formed, as shown in FIG. 20 to produce color conversion substrate 4.

Then, light source unit 2, light shutter 3 and color conversion substrate 4 shown in FIG. 1 are assembled as one unit. When light shutter 3 and color conversion substrate 4 are assembled, resin is applied to the outer circumferential edge portion of color conversion substrate 4. This resin is cured to qualify as secure member 9, which couples light shutter 3 and color conversion substrate 4 with each other. Although there is an air layer between light shutter 3 and color conversion substrate 4 in the present embodiment, the air layer may be filled with an adhesive or the like.

The method of fabricating color conversion substrate 4 and display device 1 according to the present embodiment has been described with reference to FIGS. 11-20. However, the method of fabricating color conversion substrate 4 and display device 1 is not limited thereto.

A first modification of the method of fabricating color conversion substrate 4 and display device 1 will be described hereinafter with reference to FIGS. 21-24.

Figure 21:
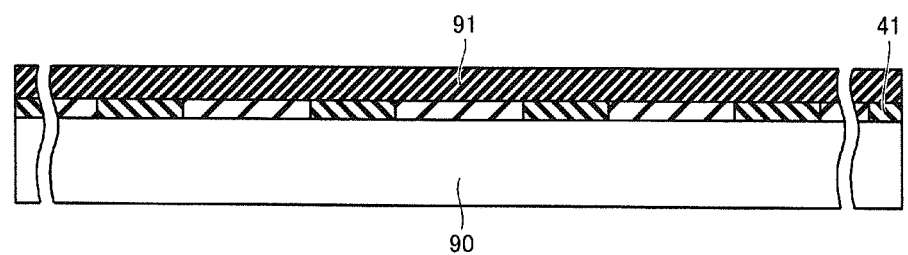
FIG. 21 is a sectional view representing a step subsequent to the fabrication step of FIG. 13.

FIG. 21 is a sectional view representing a step subsequent to the fabrication step shown in FIG. 13. As shown in FIG. 21, color filter 41 is formed on the main surface of mother substrate 90. Then, light scattering material film 91 is formed on the top face of color filter 41. This light scattering material film 91 is a negative type resist film including a liquid repellent.

Figure 22:
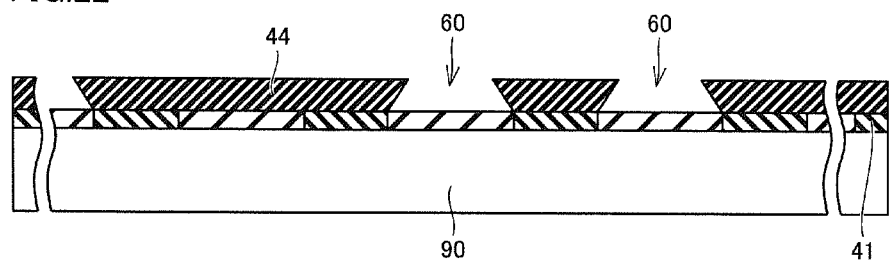
FIG. 22 is a sectional view representing a step subsequent to the fabrication step of FIG. 21.

FIG. 22 is a sectional view representing a step subsequent to the fabrication step shown in FIG. 21. As shown in FIG. 21, light scattering material film 91 is subject to exposure and development by photolithography. Accordingly, light scattering layer 44 having a plurality of holes 60 formed is provided.

Since light scattering layer 44 contains a liquid repellent, the wettability of light scattering layer 44 to the fluorescent material coating is lower than the wettability to the fluorescent material coating such as color filter 41.

Figure 23:
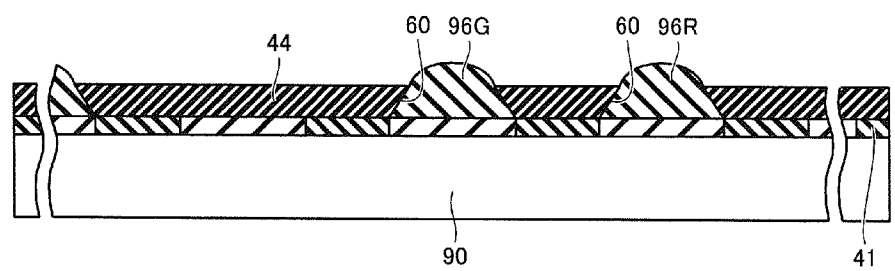
FIG. 23 is a sectional view representing a step subsequent to the fabrication step of FIG. 22.

FIG. 23 is a sectional view representing a step subsequent to the fabrication step shown in FIG. 22. As shown in FIG. 22, hole 60 is filled with green fluorescent material 96G and red fluorescent material 96R by an ink jet method.

Figure 24:
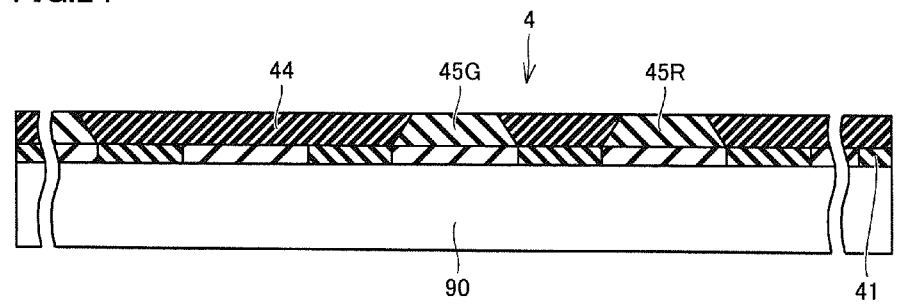
FIG. 24 is a sectional view representing a step subsequent to the fabrication step of FIG. 23.

Then, as shown in FIG. 24, green fluorescent material 96G and red fluorescent material 96R are subject to baking to produce green fluorescent material body 45G and red fluorescent material body 45R. Thus, color conversion substrate 4 can be produced. Then, light source unit 2, light shutter 3, and color conversion substrate 4 are united with each other to produce display device 1.

A second modification of a method of fabricating color conversion substrate 4 and display device 1 according to the present embodiment will be described hereinafter with reference to FIGS. 25 and 26.

Figure 25:
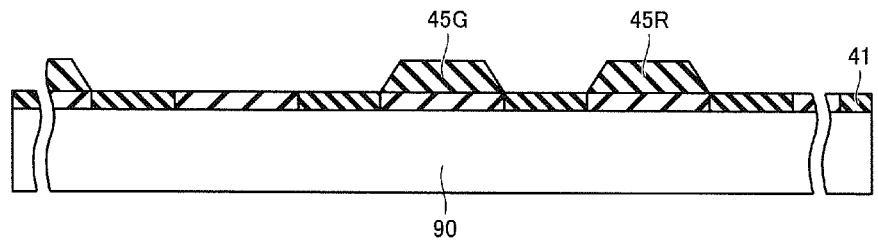
FIG. 25 is a sectional view representing a step subsequent to the fabrication step of FIG. 13.

FIG. 25 is a sectional view representing a step subsequent to the fabrication step shown in FIG. 13. In FIG. 25, color filter 41 is formed on the main surface of mother substrate 90. By applying photolithography or screen printing to the top face of color filter 41, green fluorescent material body 45G and red fluorescent material body 45R are provided.

Figure 26:
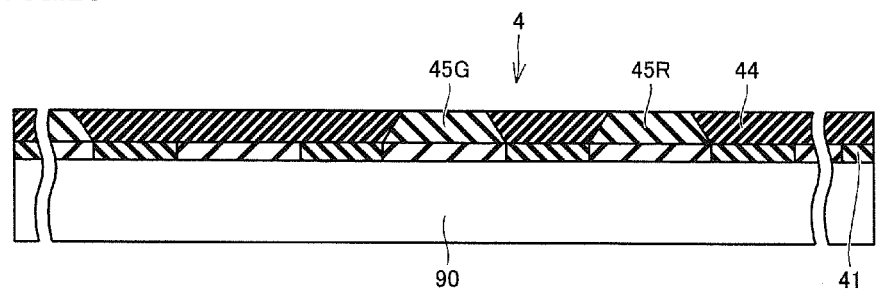
FIG. 26 is a sectional view representing a step subsequent to the fabrication step of FIG. 25.

FIG. 26 is a sectional view representing a step subsequent to the fabrication step of FIG. 25. Referring to FIG. 26, a light scattering material film is applied so as to cover red fluorescent material body 45R and green fluorescent material body 45G. Then, the light scattering material film is subject to exposure and development by photolithography. Accordingly, the light scattering material formed on the top face of red fluorescent material body 45R and green fluorescent material body 45G is removed to produce light scattering layer 44, as shown in FIG. 26. Thus, color conversion substrate 4 can be produced. Then, light source unit 2, light shutter 3 and color conversion substrate 4 are united to produce display device 1.

A third modification of the method of fabricating color conversion substrate 4 and display device 1 according to the present embodiment will be described hereinafter with reference to FIGS. 27 and 28.

Figure 27:
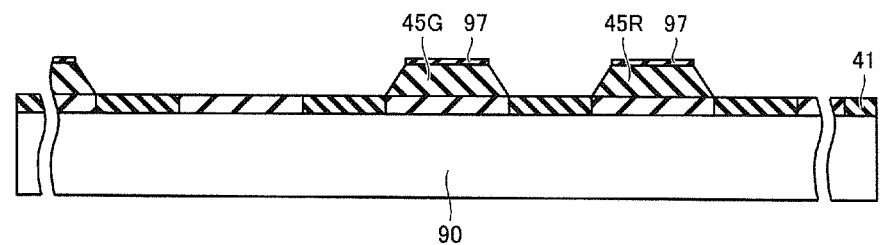
FIG. 27 is a sectional view representing a step subsequent to the fabrication step of FIG. 25.

FIG. 27 is a sectional view representing a step subsequent to the fabrication step of FIG. 25. As shown in FIG. 27, color filter 41 is formed on the main surface of mother substrate 90. Then, green fluorescent material body 45G and red fluorescent material body 45R are formed on the top face of color filter 41.

Then, a liquid repellent film is applied to the top face of color filter 41 so as to cover green fluorescent material body 45G and red fluorescent material body 45R. This liquid repellent film is a negative type film that is cured by being irradiated with ultraviolet ray. Then, this liquid repellent film is subject to exposure and development by photolithography.

Thus, liquid repellent layer 97 is formed on the top face of green fluorescent material body 45G and red fluorescent material body 45R. The wettability of liquid repellent layer 97 to the light scattering material film is lower than the wettability of green fluorescent material body 45G and red fluorescent material body 45R to the light scattering material.

Figure 28:
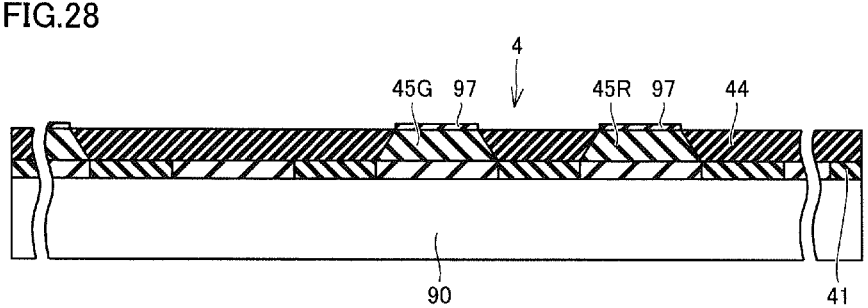
FIG. 28 is a sectional view representing a step subsequent to the fabrication step of FIG. 27.

FIG. 28 is a sectional view representing a step subsequent to the fabrication step of FIG. 27. Referring to FIG. 28, a light scattering material film is applied by an ink jet method.

Since liquid repellent layer 97 of low wettability is formed on the top face of green fluorescent material body 45G and red fluorescent material body 45R, formation of a light scattering material film on the top face of green fluorescent material 96G and red fluorescent material 96R is suppressed, resulting in the provision of light scattering layer 44.

Thus, color conversion substrate 4 can be produced. By uniting this color conversion substrate 4, light shutter 3, and light source unit 2, display device 1 can be produced.

Second Embodiment

A display device 1 according to a second embodiment will be described with reference to FIGS. 29 and 30. In the configuration shown in FIGS. 29 and 30, any element identical to or corresponding to those shown in FIGS. 1-28 has the same reference characters allotted, and description thereof may not be repeated.

Figure 29:
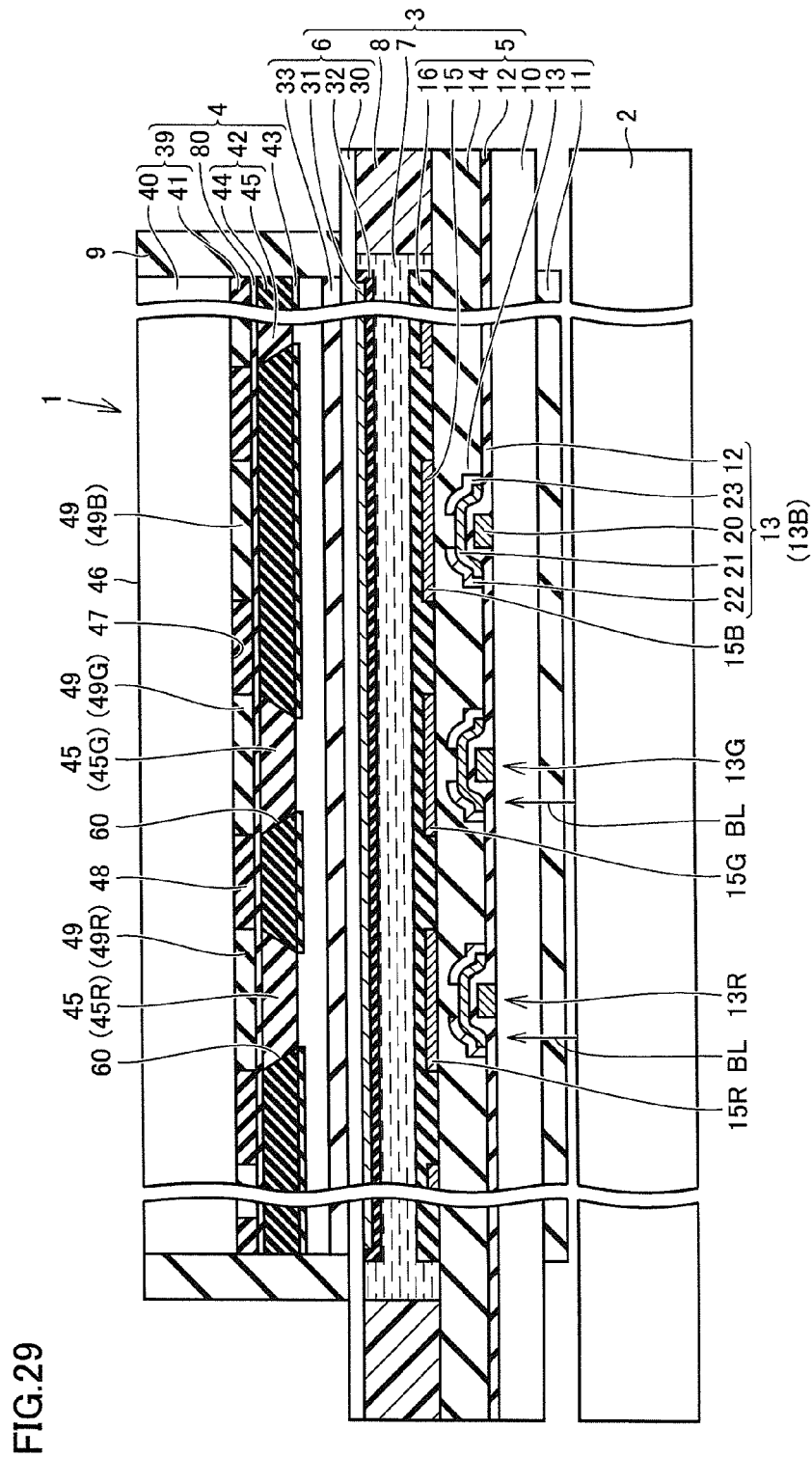
FIG. 29 is a sectional view representing a display device 1 according to a second embodiment.

FIG. 29 is a sectional view representing display device 1 according to the second embodiment. Referring to FIG. 29, color conversion substrate 4 includes a transparent substrate 40, a color filter 41 formed at a main surface of transparent substrate 40, facing light shutter 3, a low refractive index layer 80 formed at a main surface of color filter 41, facing light shutter 3, a fluorescent material layer 42 formed at the bottom side of low refractive index layer 80, and a liquid repellent layer 43 formed at fluorescent material layer 42.

Figure 30:
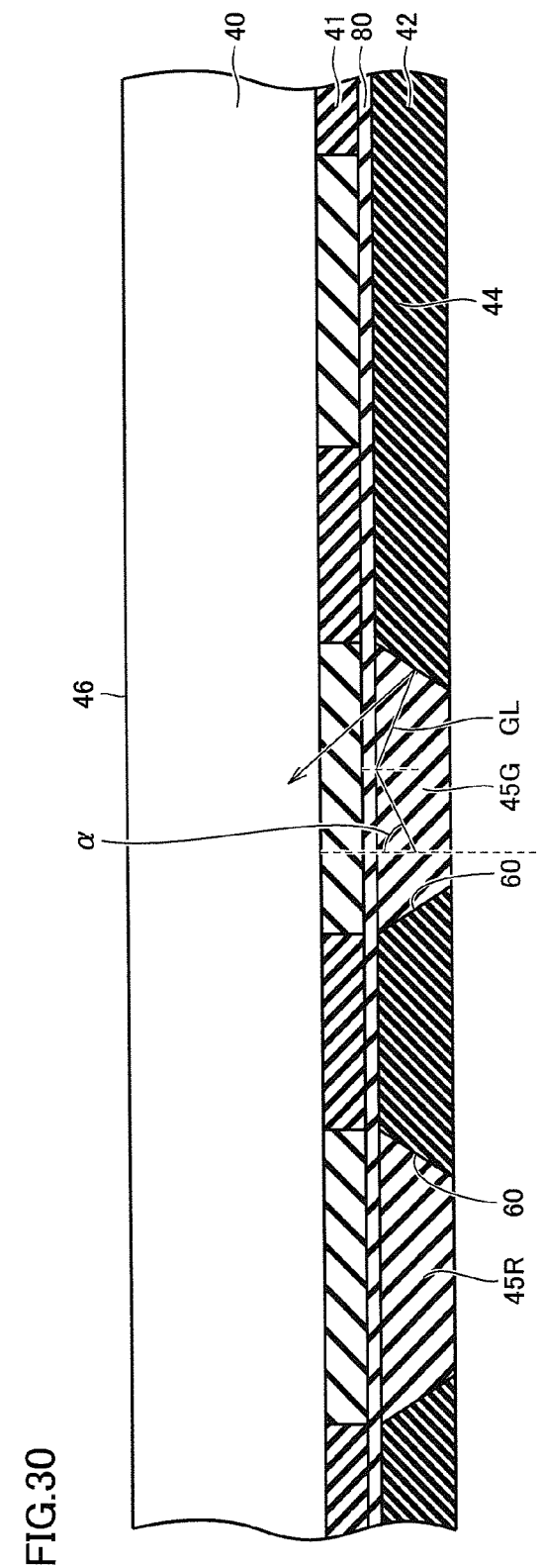
FIG. 30 is a sectional view representing a color conversion substrate 4 according to the second embodiment.

FIG. 30 is a sectional view representing color conversion substrate 4 according to the second embodiment. As shown in FIG. 30, low refractive index layer 80 is arranged between color filter 41 and fluorescent material layer 42. The refractive index of red fluorescent material body 45R and green fluorescent material body 45G is, for example, approximately 1.49-1.59. The refractive index of transparent substrate 40 is approximately 1.52, for example.

The low refractive index of layer 80 is for example, greater than or equal to 1.20 and 1.40. Thus, the refractive index of layer 80 is lower than the refractive index of red fluorescent material body 45R and green fluorescent material body 45G. Therefore, at the interface between green fluorescent material body 45G and low refractive index layer 80, any light of an incident angle greater than the critical angle is reflected at the interface.

The function of color conversion substrate 4 configured as set forth above will be described hereinafter. The entry of blue light BL to green fluorescent material body 45G causes green light GL to be output in green fluorescent material body 45G.

Green light GL having an emission angle α greater than a predetermined angle, from green GL exhibiting luminescence emission at green fluorescent material body 45G, is reflected at the interface between low refractive index layer 80 and green fluorescent material body 45G to be incident on the inner side face of hole 60. In contrast, any green light GL of a small emission angle α will have an incident angle to the interface between green fluorescent material body 45G and low refractive index layer 80 smaller than the critical angle. As a result, that light will not be reflected at the interface between green fluorescent material body 45G and low refractive index layer 80 to enter low refractive index. Here, green light GL entering low refractive index layer 80 directly passes through green filter portion 49G and transparent substrate 40 to be output outside.

In contrast, green light GL of a large emission angle α has a greater incident angle to the interface between green fluorescent material body 45G and low refractive index layer 80. Therefore, the incident angle of green light GL will readily become greater than the critical angle to low refractive index layer 80 and green fluorescent material body 45G, so that the relevant green light GL is reflected at the interface between green fluorescent material body 45G and low refractive index layer 80.

Green light GL reflected at the interface between green fluorescent material body 45G and low refractive index layer 80 is then incident on the inner side face of hole 60. The thickness of light scattering layer 44 in the incident direction of green light GL is greater than the film thickness of light scattering layer 44. Therefore, the reflectance ratio at the inner side face of hole 60 is high, such that green light GL is favorably reflected at the inner side face of hole 60.

Green light GL reflected at the inner side face of hole 60 enters again the interface between green fluorescent material body 45G and low refractive index layer 80. Green light GL reflected at the inner side face of hole 60 has an incident angle, when entering the aforementioned interface, smaller than the critical angle. As a result, green light GL is not reflected at the interface between green fluorescent material body 45G and low refractive index layer 80, and enters low refractive index layer 80.

The refractive index of low refractive index layer 80 is smaller than the refractive index of green filter portion 49G of color filter 41. Therefore, green light GL incident on low refractive index layer 80 is not reflected at the interface between low refractive index layer 80 and green filter portion 49G, and enters green filter portion 49G.

Then, green light GL passing through green filter portion 49G is incident on the interface between main surface 46 of transparent substrate 40 and the outside air.

Thus, green light GL having an emission angle α smaller than the predetermined angle is directly output outside from main surface 46 of transparent substrate 40, while green light GL having an emission angle α greater than the predetermined angle is once reflected at the inner side face of hole 60, and then output outside from main surface 46.

As a comparative example, a color conversion substrate 4 having fluorescent material layer 42 formed directly on transparent substrate 40 will be evaluated. In this comparative example, the entry of blue light BL from light source unit 2 into green fluorescent material body 45G will cause excitation thereof, whereby light rays of green GL are output radially. Here, there is substantially no difference in the refractive index between green fluorescent material body 45G and transparent substrate 40, so that green light GL from green fluorescent material body 45G enters transparent substrate 40 with substantially no reflectance at the interface between transparent substrate 40 and green fluorescent material body 45G.

Green light GL having a large incident angle to the interface between transparent substrate 40 and green fluorescent material body 45G, from light rays of green GL, is reflected at the interface between transparent substrate 40 and the outside air. Green light GL reflected at the interface between transparent substrate 40 and the outside air travels towards the side face of transparent substrate 40.

Thus, in the comparative example in which low refractive index layer 80 is not provided, at least a portion of green light GL illuminated in green fluorescent material body 45G is not output from main surface 46, degrading the light usage efficiency.

In contrast, color conversion substrate 4 according to the second embodiment can suppress generation of the aforementioned stray light, allowing the usage efficiency of light illuminated within green fluorescent material body 45G to be improved.

The usage efficiency of light illuminated at green fluorescent material body 45G described with reference to FIGS. 29 and 30 also applies to that of red fluorescent material body 45R.

Third Embodiment

Figure 31:
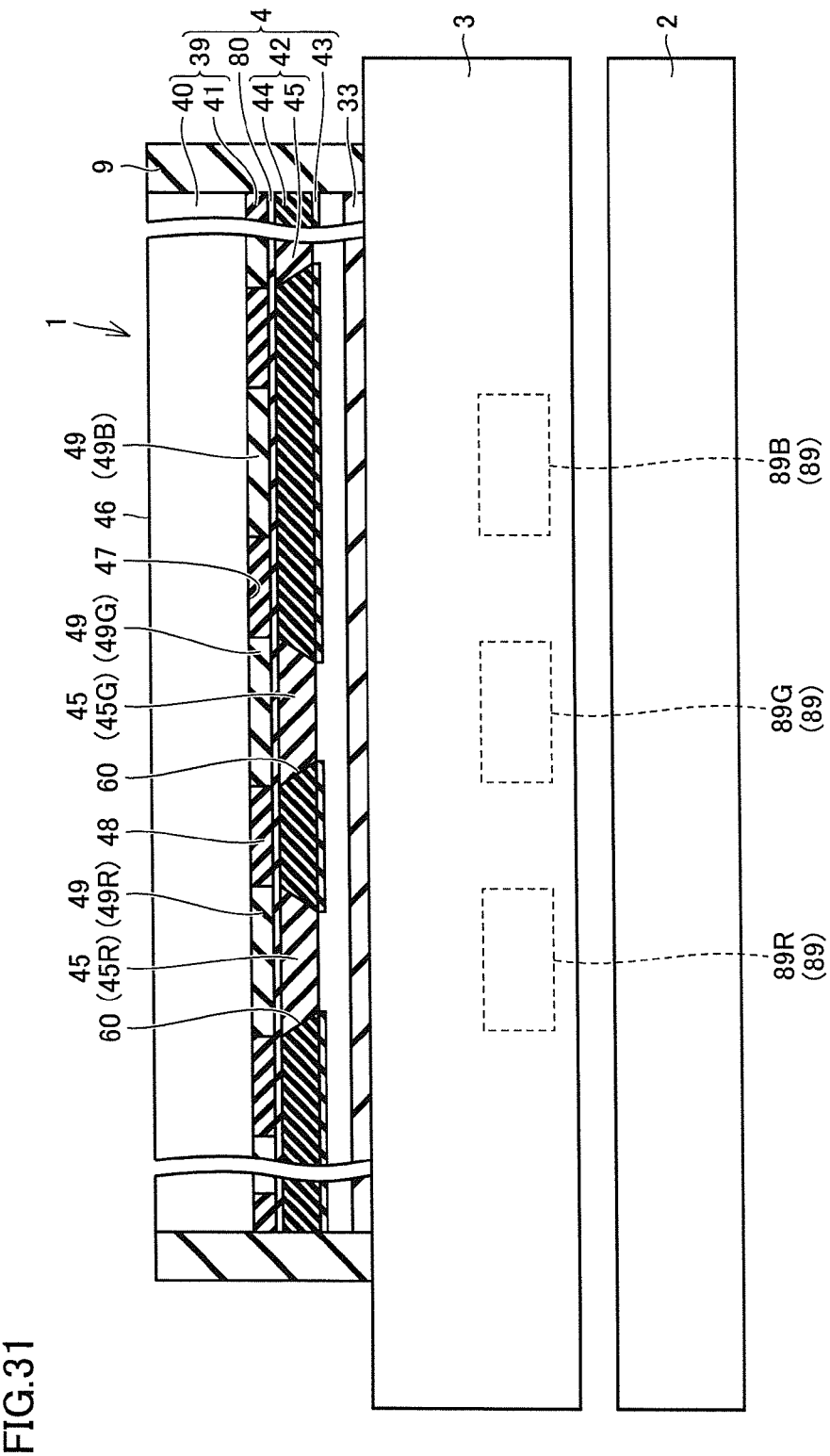
FIG. 31 is a sectional view of a display device 1 according to a third embodiment.

A display device 1 and a color conversion substrate 4 according to a third embodiment will be described with reference to FIGS. 31 and 32. FIG. 31 is a sectional view of display device 1 according to the third embodiment. Display device 1 shown in FIG. 31 includes light source unit 2, light shutter 3, and color conversion substrate 4. In the third embodiment, light shutter 3 employs the MEMS mechanism. Light shutter 3 has a plurality of shutter elements 89 provided in the main body of the device.

Specifically, light shutter 3 includes a shutter element 89G arranged below green fluorescent material body 45G, a shutter element 89R arranged below red fluorescent material body 45R, spaced apart from shutter element 89G, and a shutter element 89B arranged below blue filter portion 49B.

Shutter elements 89R and 89G selectively block blue light BL from light source unit 2 to selectively cause blue light BL to enter each fluorescent material body. Similarly, shutter element 89B selectively causes blue light BL from light source unit 2 to enter light scattering layer 44.

Figure 32:
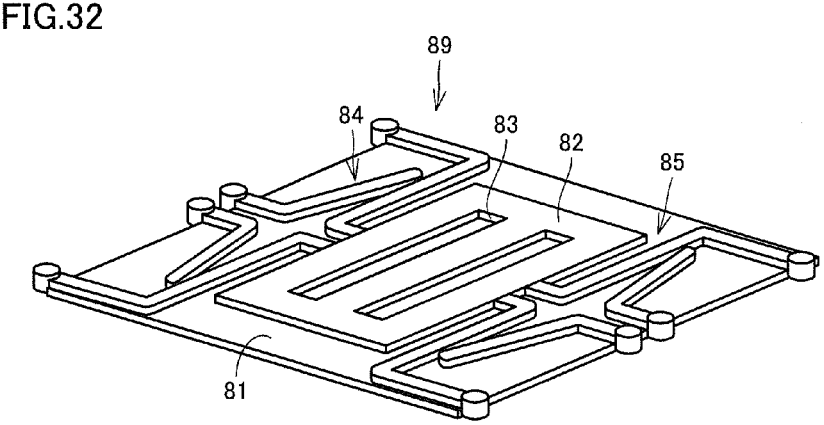
FIG. 32 is a perspective view specifically representing a shutter element 89.

FIG. 32 is a perspective view schematically representing shutter element 89. As shown in FIG. 32, shutter element 89 includes a reflecting plate 81 having an opening formed, a shutter plate 82 provided on reflecting plate 81, and having an opening 83 formed, and drive units 84 and 85 for driving shutter plate 82 in a sliding manner. Shutter plate 82 is driven in a time-divisional manner.

By the movement of shutter plate 82 to provide communication between the opening of reflecting plate 81 and opening 83 of shutter plate 82, blue light BL from light source unit 2 enters corresponding green fluorescent material body 45G, red fluorescent material body 45R or a diffuser 45E.

The light shutter employing this MEMS mechanism is absent of a polarizing plate, allowing the usage efficiency of light from light source unit 2 to be improved.

Moreover, since the response rate of shutter plate 82 is fast and the influence of ambient temperature is low, an image can be displayed favorably.

Figure 33:
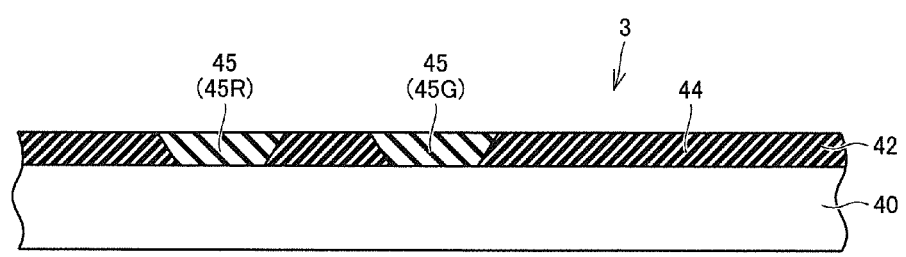
FIG. 33 is a sectional view representing a modification of color conversion substrate 4.

Although the first to third embodiments have been described in which hole 60 in color conversion substrate 4 has a shape where the opening area becomes smaller as a function of distance from transparent substrate 40, the shape of hole 60 is not limited thereto. FIG. 33 is a sectional view representing a modification of color conversion substrate 4. As shown in FIG. 33, hole 60, green fluorescent material body 45G and red fluorescent material body 45R may be formed such that the width becomes smaller as a function of approaching transparent substrate 40.

It is to be understood that the embodiments disclosed herein are only by way of example, and not to be taken by way of limitation. The scope of the present invention is not limited by the description above, but rather by the terms of the appended claims, and is intended to include any modifications within the scope and meaning equivalent to the terms of the claims.

REFERENCE SIGNS LIST 1 display device; 2 light source unit; 3 light shutter; 4 color conversion substrate; 5 substrate; 6 opposite substrate; 7 liquid crystal layer; 8 seal member; 9 secure member; 10 transparent substrate; 11, 33 polarizing plate; 12 gate insulation film; 14 interlayer insulation film; 15, 15R, 15G, 15B pixel electrode; 16, 32 alignment film; 20 gate electrode; 21 semiconductor layer; 22 source electrode; 23 drain electrode; 30, 40 glass substrate; 31 common electrode; 41 color filter; 42 fluorescent material layer; 43, 97 liquid repellent layer; 44 light scattering layer; 45 fluorescent material body; 45B diffuser; 45G green fluorescent material body; 45R red fluorescent material body; 46, 47, 50, 51, 53, 54, 70, 71 main surface; 48 black matrix; 49 filter portion; 49B blue filter portion; 49G green filter portion; 49R red filter portion; 52 measurement device; 55 light source; 60, 93 hole; 61 incident region; 72 circumferential face; 73, 74, 75, 76 side face; 80 low refractive index layer; 81 reflecting plate; 82 shutter plate; 83 opening; 84, 85 drive unit; 89 shutter element; 90 mother substrate; 91 light scattering material film; 92 mask; 94 cured portion; 95 liquid repellent material film; 96G green fluorescent material; 96R red fluorescent material; BL, BL1 blue light; GL green light; L1, L3, L5 incident light; L2 outgoing light; L4, L8 distance; R3 region; S scattering intensity; T film thickness; VL virtual line.

The invention claimed is:

1. A color conversion substrate comprising:
   a main plate having a first main surface, and including a transparent substrate, and;
   a fluorescent material layer including a light scattering layer formed at said first main surface for scattering incident light and emitting the light outside, and having a plurality of holes formed so as to penetrate said light scattering layer, and a fluorescent material body formed in said plurality of holes, exhibiting luminescence emission when light of an incident wavelength region is incident, said light scattering layer having an inner surface defining said plurality of holes, configured to reflect light output from said fluorescent material body towards said main plate, wherein in plan view, said light scattering layer is formed in a region wherein said plurality of holes are not formed.

2. The color conversion substrate according to claim 1, wherein the inner surface of said light scattering layer defining said plurality of holes is arranged inclining relative to said first main surface.

3. The color conversion substrate according to claim 1, wherein a plurality of said fluorescent material bodies are provided spaced apart, a distance between said fluorescent material bodies is greater than a film thickness of said light scattering layer.

4. The color conversion substrate according to claim 1, wherein a reflectance ratio of light of said light scattering layer is greater than transmittance of light.

5. The color conversion substrate according to claim 1, wherein
said light scattering layer includes a second main surface and a third main surface aligned in a thickness direction, and
light entering from said second main surface of said light scattering layer and output from said third main surface has Lambertian property.

6. The color conversion substrate according to claim 1, wherein said light scattering layer includes a resin layer having light transmittance, and a plurality of scattering particles scattered in said resin layer, said scattering particles have Mie scattering property, and a particle size of said scattering particle is greater than or equal to 200 nm and less than or equal to 1000 nm.

7. The color conversion substrate according to claim 1, wherein a crossing angle between the inner surface of said light scattering layer defining said plurality of holes and said main plate is greater than or equal to 25° and less than or equal to 65°.

8. The color conversion substrate according to claim 1, further comprising a low refractive index layer, provided between said main plate and said fluorescent material body, having a refractive index smaller than the refractive index of said fluorescent material body.

9. The color conversion substrate according to claim 1, wherein
said main plate includes a color filter provided between said fluorescent material layer and said transparent substrate, and
said fluorescent material layer includes a first fluorescent material body configured to exhibit luminescence emission of light of a first wavelength region when incident light is entered, and a second fluorescent material body configured to exhibit luminescence emission of light of a second wavelength region when incident light is entered, said color filter includes a first filter portion arranged between said first fluorescent material body and said transparent substrate, a second filter portion arranged between said second fluorescent material body and said transparent substrate, and a third filter portion arranged between said light scattering layer and said transparent substrate, and said first filter portion configured to transmit light of said first wavelength region and absorb light of a wavelength region other than said first wavelength region, said second filter portion configured to transmit light of a second wavelength region and absorb light of a wavelength region other than said second wavelength region, and said third filter portion configured to transmit light of said incident wavelength region and absorb light of a wavelength region other than said incident wavelength region.

10. A display device comprising:
a color conversion substrate defined in claim 1,
a light source unit configured to emit light of said incident wavelength region, and
a light shutter configured to selectively block light from said light source unit to cause light from said light source unit to selectively enter said color conversion substrate,
said light shutter including a first shutter element configured to selectively block light from said light source unit towards said fluorescent material body, and a second shutter element configured to selectively block light from said light source unit towards said light scattering layer,
a distance between an incident position and said fluorescent material body being greater than a film thickness of said light scattering layer, said incident position being where light from said light source unit and passing through said second shutter element is incident on said light scattering layer.

11. The color conversion substrate according to claim 9, wherein said third filter portion is configured to transmit light of a wavelength region greater than or equal to 390 nm and less than or equal to 510 nm and that no fluorescent material body is provided in a region corresponding to said third filter portion.

12. A display device comprising the color conversion substrate according to claim 1 and a light source unit configured to emit blue light.

* * * * *